United States Patent [19]

Herzog et al.

[11] 4,019,881
[45] Apr. 26, 1977

[54] MOISTURE SEPARATOR FOR A NUCLEAR STEAM TURBINE

[75] Inventors: Josef Herzog, Scotia, N.Y.; Kenneth K. Woods, Cape Elizabeth, Maine; William S. Hubble, Gulfport, Miss.

[73] Assignee: General Electric Company, Schenectady, N.Y.

[22] Filed: June 3, 1975

[21] Appl. No.: 583,354

[52] U.S. Cl. .................................. 55/185; 55/199
[51] Int. Cl.² ...................................... B01D 19/00
[58] Field of Search ........................... 55/171–177, 55/183, 185, 199, 201, 204; 122/483

[56] References Cited

UNITED STATES PATENTS

| | | | |
|---|---|---|---|
| 2,151,863 | 3/1939 | Millard | 55/185 |
| 2,614,648 | 10/1952 | Wilson | 55/199 X |
| 2,739,668 | 3/1956 | Huge | 55/204 X |
| 2,788,080 | 4/1957 | Guarin | 55/183 |
| 2,868,312 | 1/1959 | Erwin | 55/174 |
| 3,009,538 | 11/1961 | O'Dell | 55/174 X |

*Primary Examiner*—Thomas G. Wyse
*Assistant Examiner*—Robert H. Spitzer

*Attorney, Agent, or Firm*—James W. Mitchell; John F. Ahern

[57] ABSTRACT

An improved moisture separator suitable for a nuclear steam turbine-generator power plant is disclosed. The separator is of the type having wiggle plate or inertial-type moisture separator elements aranged in axially disposed banks within a generally horizontal, cylindrical vessel, sealed at both ends. Wet steam inlets are provided below the horizontal axis of the vessel and dry steam outlets are placed above the axis. Impingement baffles are provided for each steam inlet; these baffles are disposed between the wet steam inlets and the moisture separator elements. An axially extending trough is provided for directing condensate from the moisture separator elements to a hotwell. The trough is substantially enclosed to provide a sheltered collection area for the condensate and prevent the reentrainment of condensate in the steam flowing through the separator. The relative placement and the size of the various components of the separator are related to the steam inlet inner diameter for optimum separator performance.

13 Claims, 5 Drawing Figures

FIG. 4
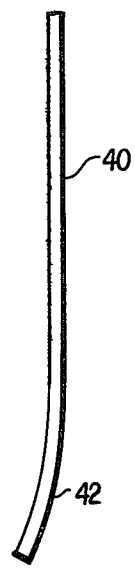
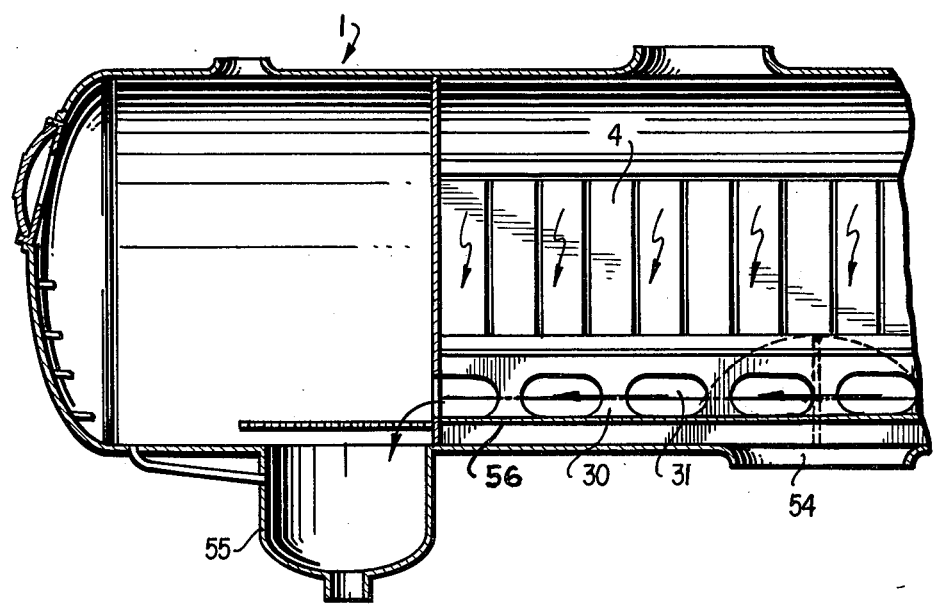
FIG. 5

MOISTURE SEPARATOR FOR A NUCLEAR STEAM TURBINE

BACKGROUND OF THE INVENTION

1. Field of the Invention

The invention relates generally to moisture separators for condensing moisture from steam, and more particularly to an inertial-type moisture separator suitable for use with a nuclear steam turbine.

2. Description of the Prior Art

In a steam turbine-generator power plant and more particularly in a nuclear steam turbine-generator power plant large quantities of steam are produced at a relatively low initial pressure and temperature compared to the steam generated in most fossil fuel power plants. This can be troublesome since an increase in the moisture content of steam in a turbine will generally decrease its efficiency and life expectancy. Thus, in a nuclear steam power plant, after a first expansion through a high pressure turbine it becomes desirable to remove moisture from the steam before sending it to a lower pressure turbine.

One arrangement used in the prior art for removing moisture from steam before expansion in a low pressure turbine employs a steam reheater between the high and low pressure turbines. This invention is directed to a steam separator which is particularly useful where reheating between the high and low pressure turbines is not considered economical.

In general, moisture separators that employ inertial-type separator elements require uniform flow distribution among the numerous separator elements to obtain effective moisture separation with a minimum pressure drop. In the past it has been necessary to limit the size of steam separator units using inertial-type separator elements in an effort to obtain this desirable flow distribution and low pressure drop. This size limitation has necessitated the use of a plurality of small inertial-type separator units in many instances where larger steam separator units would have been less costly to construct and install.

Accordingly, one object of the present invention is to provide a moisture separator of the kind using inertial-type separator elements that has improved flow distribution to the numerous separator elements.

Another object of the present invention is to provide an inertial-type moisture separator with a larger flow capacity than that of prior art moisture separators but with good moisture separating capability and a minimum pressure drop.

Another object of the invention is to provide an inertial-type moisture separator unit that will reduce the number of moisture separator units required to remove moisture from a given flow of steam.

Another object of the invention is to provide an inertial-type moisture separator unit with improved condensate collection and removal.

SUMMARY OF THE INVENTION

Briefly stated, these and other objects of the invention are carried out with a moisture separator enclosed in a horizontally disposed cylindrical vessel having wet steam inlets below the horizontal axis of the vessel, dry steam outlets above the horizontal axis, banks of inertial-type moisture separator elements arranged in a vee configuration between the steam inlets and steam outlets, and an impingement baffle disposed between each of the wet steam inlets and the moisture separator elements. An axially extending trough is included to direct the condensate to a hotwell and advantageously forms a portion of the impingement baffles. The trough is substantially enclosed to provide a sheltered collection area for the condensate and prevent the reentrainment of condensate in the steam flowing through the separator. The impingement baffles impart a vortex flow to the incoming steam which serves to evenly distribute the steam over the moisture separator elements, and direct the steam flow in such a manner as to help the force of gravity in removing condensate from the moisture separator elements. The relative placement and size of the various components of the separator are related to the steam inlet inner diameter for optimum separator performance.

BRIEF DESCRIPTION OF THE DRAWINGS

FIG. 4 is a partial side view of the impingement baffle shown in FIG. 3.

FIG. 5 is a vertical section taken along the longitudinal axis of another embodiment of the invention.

DESCRIPTION OF THE PREFERRED EMBODIMENT

Figure 1:
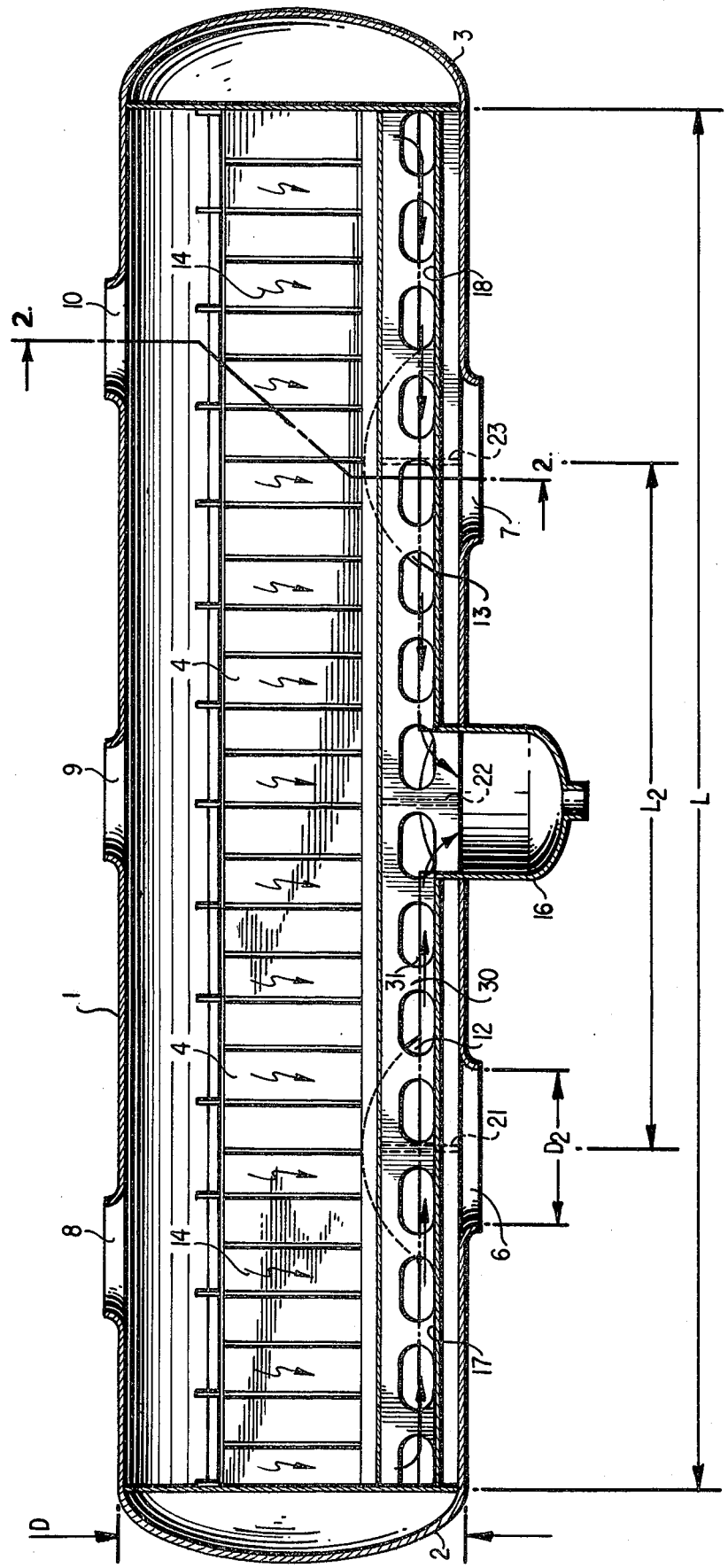
FIG. 1 is a vertical section taken along a longitudinal axis of a moisture separator formed in accordance with the invention.

Referring to FIG. 1 the moisture separator is housed in cylindrical pressure vessel 1 having an inner diameter D, an active length L and capped ends 2 and 3. Inside the vessel 1 there are banks of moisture separator elements designated generally by the numeral 4. The moisture separator elements are of a low pressure drop, inertial-separator type, sometimes known as wiggle plate or zigzag separators. The vessel is provided at the bottom with two wet steam inlets 6 and 7 each having an inner diameter $D_2$ and separated axially by a distance $L_2$. Three dry steam outlets 8, 9 and 10 are provided at the top of the vessel, each dry steam outlet being displaced axially from the vertical centerlines of the steam inlets 6 and 7. In other embodiments of the invention a larger or smaller number of wet steam inlets, arranged in accordance with the invention, may be provided. The number of dry steam outlets are not important as long as they are large enough and numerous enough not to hinder the flow of steam from the separator. Impingement baffles 12 and 13 (shown with dotted lines in FIG. 1), roughly circular in shape, are provided to diffuse and direct the steam entering the steam inlets 6 and 7. Condensate drains from the moisture separator elements 4 downwardly in the direction of the arrows 14. An axially extending trough is provided for collecting the condensate dropping from the moisture separator elements 4 and directing it to a hotwell 16. In this embodiment of the invention the trough is provided with two sections 17 and 18 extending to a center hotwell 16. In other embodiments of the invention the separator may be provided with a continuous trough extending the length of the separator to an end hotwell as illustrated in FIG. 5. In the present embodiment the troughs 17 and 18 are pitched one eighth inch per foot to aid in draining condensate to the hotwell 16. The troughs 17 and 18 extend over the steam inlets 6 and 7 and are advantageously used as a portion of the impingement baffles 12 and 13, to diffuse and direct steam entering the steam inlets 6 and 7. A plurality of inverted vee shaped support elements designated generally by the numerals 21 through 23 are provided for maintaining the separator elements 4, impingement baffles 12 and 13, and drain troughs 17 and 18 in a spaced relationship.

In achieving the objects of this invention, it has been found to be important to the aerodynamic design of this type of moisture separator unit that the distance $L_2$ between the wet steam inlets 6 and 7 be equal to or smaller than twice the inner diameter D of the vessel, that is:

$$L_2 \leq 2D$$

This is important since it has been found that flow distribution to the moisture separator elements deteriorates for larger L/D ratios. It has also been found that the optimum moisture separator area, $A_{ms}$ for a moisture separator unit of this type may be expressed as a function of the total steam inlet area, $A_2$, by the following relationship:

$$A_{ms} \cong .1 A_2$$

Thus, if the height of the moisture separator elements in an end view is H (shown in FIG. 2) the active length L of the moisture separator may be determined since:

$$L = A_{ms}/2H$$

Figure 2:
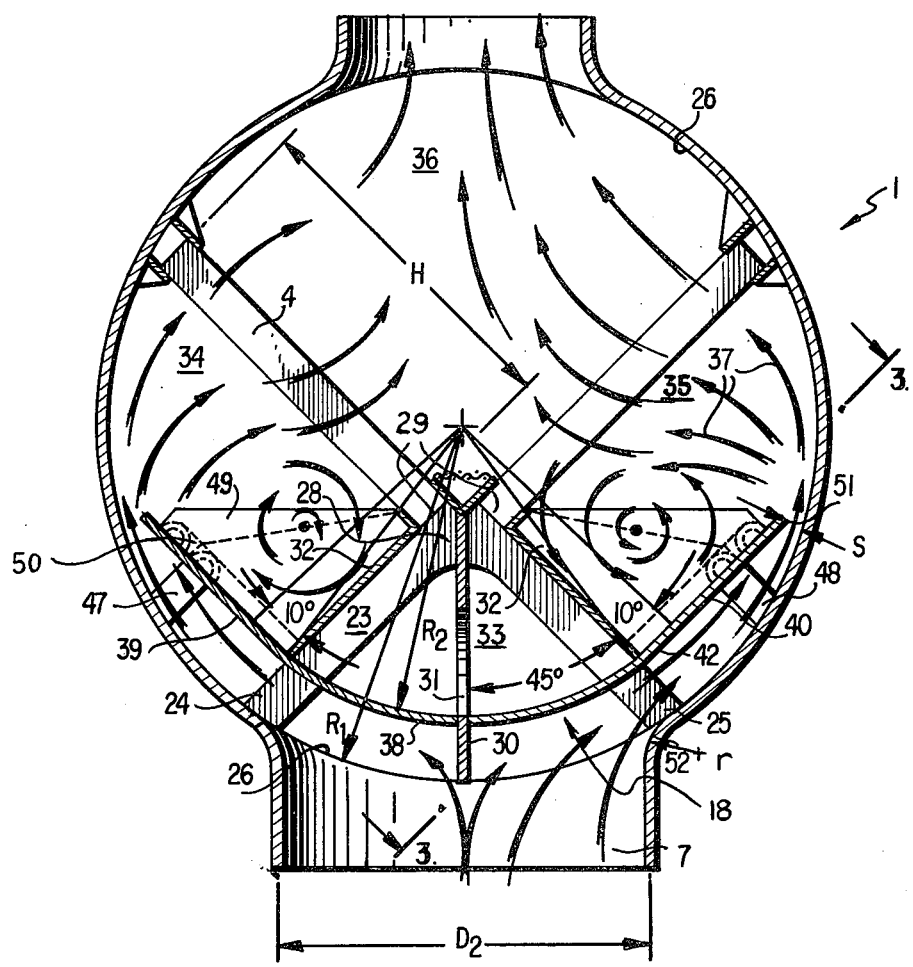
FIG. 2 is a transverse section taken along line 2 — 2 of FIG. 1.

Referring now mainly to FIG. 2, the relative placement and shape of the moisture separator elements 4, troughs 17 and 18, and impingement baffles 12 and 13 will be described. The support members 21 through 23, of which support member 23 is representative, comprise a plurality of inverted vee-shaped elements having divergent ends 24 and 25 attached to the inner surface 26 of the vessel 1, and convergent end 28 attached to the moisture separator elements 4. Additional support to the troughs 17 and 18 and the separator elements 4 is provided by a vertical member 30, having slots 31 therein which extend the length of the separator vessel. In addition to adding structural support to the troughs and separator elements, vertical member 30 is provided to hinder the reentrainment of condensate dropping from the separator elements 4 through openings indicated generally by the numeral 29. The troughs 17 and 18 and the panels 32 define an axially disposed condensate collection chamber 33 that receives condensate from the axially extending openings 29 and delivers it to the hotwell 16. The troughs are substantially enclosed by the panels 32 to hinder reentrainment of condensate by providing a chamber well protected from the main steam flow for the condensate to collect. The vee-shaped arrangement of moisture separator elements serves to divide the vessel 1 in three longitudinal plenums 34, 35, and 36. The impingement baffles 12 and 13 are provided to diffuse and direct the incoming wet steam into the two wet steam plenums 34 and 35 which operate at a higher pressure than the center or dry steam plenum 36.

The impingement baffles 12 and 13 are an important part of the invention since the proper flow distribution to the moisture separator elements 4 depends upon these impingement baffles, or their equivalent. According to the invention the impingement baffles must be so designed to impart a vortex flow, as generally indicated by the arrows 37, in the wet steam plenum 35. The vortex 37 imparted to the incoming steam flow by the impingement baffles 12 and 13 serves to evenly distribute the incoming steam over the area of the separator elements 4. In addition to distributing the flow of incoming steam the vortex 37 aids the force of gravity in sweeping the condensate from the moisture separator elements 4 into the troughs 17 and 18. This improves the efficiency of the moisture separator elements in terms of moisture removal. Referring now to the impingement baffle shown in FIG. 2, which is representative of both impingement baffles 12 and 13, the impingement baffles is comprised of an arcuate section 38 and two relatively straight sections 39 and 40. The distance between the arcuate section 38 of the impingement baffle and the inner surface 26 of the vessel 1 is important to the aerodynamic design of the separator. If the radius of the arcuate section 38 is $R_2$, it has been found that the distance between the arcuate section 38 of the impingement baffle and the inner surface 26 of the vessel may be expressed as a function of the inner radius of the vessel $R_1$ and the inner diameter $D_2$ of the wet steam inlet by the following relationship:

$$R_1 - R_2 \cong 0.2 D_2$$

Figure 3:
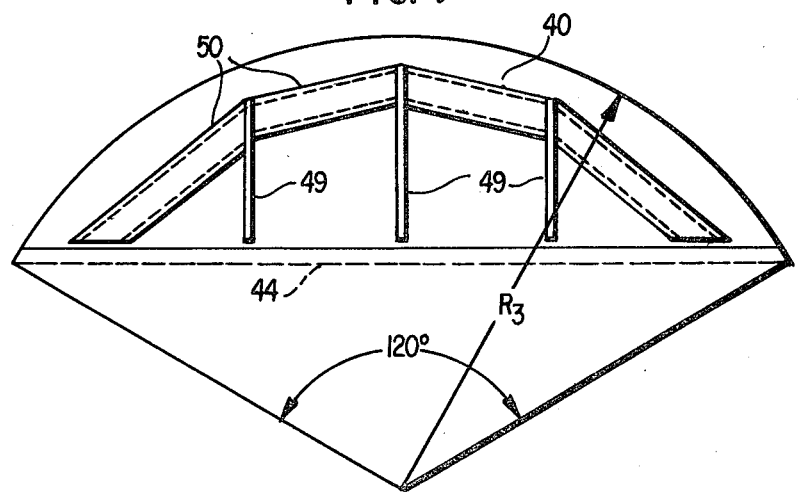
FIG. 3 is a view of a portion of the impingement baffle used in the invention, taken along line 3 — 3 of FIG. 2, with a developed view of the same portion of the baffle shown in dotted lines.

The placement of the trough 18, axially disposed on the vertical center line of the vessel 1 and connected to the support member 23 advantageously provides for the trough 18 to be used as the arcuate section 38 of the impingement baffle 13. In cross-section the trough 18 is provided with a 90° arcuate section with a curvature of radius $R_2$. In addition to the support member 23 the trough 18 is supported by vertical member 30 to further add to its structural rigidity. The shape of the two relatively straight sections 39 and 40 of the impingement baffle is best described in reference to FIGS. 3 and 4. Each relatively straight baffle section 39 and 40 is provided with a 10° arcuate portion 42 having a curvature such that there is a smooth transition from the radius $R_2$ to the straight portion of the impingement baffle. Each relatively straight baffle section before being curved is roughly comprised of a truncated 120° section of a circle defined by a radius $R_3$ and a base line 44. The dotted lines of FIG. 3 depict a developed view of the relatively straight baffle section 40. It has been found to be important to the optimum aerodynamic performance of the impingement baffle that the radius $R_3$ be related to the diameter $D_2$ of the incoming wet steam inlet in the following manner:

$$R_3 \cong 1.3 D_2$$

Referring now mainly to FIG. 2, the relatively straight sections 39 and 40 of the impingement baffle are also attached to the inner surface 26 of the vessel 1 by support members 47 and 48 respectively. Support members 47 and 48 serve to support the relatively straight baffle sections 39 and 40 in a spaced relationship with respect to the inner surface 26 of the vessel 1. Additional support for the relatively straight baffle sections 39 and 40 is provided by vertical support members generally indicated by the numeral 49 and baffle stiffening members 50. The radial distance between the impingement baffle and the inner surface 26 of the vessel 1 is thus fixed and is important to the aerodynamic design of the separator. This dimension is important since it controls a local high flow velocity peak in the region between the tip 51 of the impingement baffle and the inner surface 26 of the vessel 1. This velocity peak is an important factor in causing the desired vortex flow indicated by the arrows 37. It has been found that the radial distance, S, between the inner surface 26 of the vessel 1 and the tip 51 of the impingement baffle is related to the wet steam inlet diameter $D_2$ in the following manner:

$$S \cong .07D_2$$

Given an active length, L, for the vessel, it is necessary to fix the area of the separator element 4 for optimum flow and steam separation characteristics. This is done by providing a height H for the separating elements that is related to the steam inlet diameter $D_2$ in the following manner:

$$H \cong KD_2$$

where $K = 1.1$ to $1.5$

It has also been found that to provide a smooth flow of wet steam through the stream inlet 7 and under the impingement baffle, it is necessary that a curvature 52 of radius r be provided, r being related to the diameter of the steam inlet $D_2$ in the following manner:

$$r \geq .06D_2$$

Referring now to FIG. 5 a hotwell construction used in other embodiments of the invention is illustrated. In embodiments of the invention having an odd number of wet steam inlets 54 the separator will be provided with an end hotwell 55. The trough 56 will extend the entire length of the vessel 1, and the entire moisture separator vessel will be tilted approximately one eighth inch per foot to obtain the desired drainage.

In the operation of a steam separator built in accordance with the invention, relatively high pressure wet steam from the exhaust of a high pressure turbine enters the separator through the wet steam inlets 6 and 7 to impinge upon the baffles 12 and 13. The baffles cause a vortex 37 in the incoming steam flow on either side of the baffles in the high pressure wet steam plenums 34 and 35. These vortices serve to evenly distribute the flow of steam to the moisture separator elements 4 associated with both wet steam plenums, and serve to aid the effect of gravity in sweeping the condensate on the moisture separating elements 4 into the troughs 17 and 18. The troughs 17 and 18 prevent the reentrainment of condensate by providing a substantially enclosed area sheltered from the main steam flow for the condensate to drain. Dry steam exiting the moisture separator elements 4 into the relatively low pressure dry steam plenum 36 then flows to the low pressure turbine through the steam separator outlets 8, 9 and 10.

Other modifications of the invention will occur to those skilled in the art and it is desired to cover in the appended claims all such modifications as fall within the scope of the invention.

What is claimed as new and desired to be secured by Letters Patent of the United States is:

1. A moisture separator comprising:
    a. a vessel sealed at both ends and having a generally horizontal axis,
    b. a plurality of axially displaced wet steam inlets disposed below said horizontal axis,
    c. a plurality of dry steam outlets disposed above said horizontal axis,
    d. a plurality of inertial-type moisture separator elements disposed in axially extending banks between said wet steam inlets and said dry steam outlets,
    e. a drain trough below said moisture separator elements for collecting condensate and directing it to a hot well,
    f. a plurality of support means axially displaced along the length of said vessel for supporting said drain trough and said moisture separator elements,
    g. an impingement baffle for each of said wet steam inlets, each impingement baffle being disposed between its respective wet steam inlet and said moisture separator elements, and
    h. each of the ends of said impingement baffles being spaced from the inner surface of said vessel by a distance such that a vortex is imparted to the steam to effect more even distribution of steam to said moisture separator elements and to assist in the removal of condensate from said moisture separator elements.

2. A moisture separator comprising:
    a. a vessel sealed at both ends and having a generally horizontal axis,
    b. a plurality of axially displaced wet steam inlets disposed below said horizontal axis,
    c. a plurality of dry steam outlets disposed above said horizontal axis,
    d. a plurality of inertial-type moisture separator elements disposed in axially extending banks between said wet steam inlets and said dry steam outlets,
    e. a drain trough below said moisture separator elements for collecting condensate and directing it to a hotwell,
    f. a plurality of support means axially displaced along the length of said vessel for supporting said drain trough and said moisture separator elements,
    g. an impingement baffle for each of said wet steam inlets, each impingement baffle being disposed between its respective wet steam inlet and said moisture separator elements, and
    h. each of the ends of said impingement baffles being spaced from the inner surface of said vessel by a distance related to the inner diameter of said wet steam inlets such that a vortex flow is imparted to the steam to effect more even distribution of steam to said moisture separator elements and to assist in the removal of condensate from said moisture separator elements.

3. A moisture separator comprising:
    a. a vessel, having an inner diameter D, a radius $R_1$, and a generally horizontal axis; said vessel being sealed at both ends,
    b. a plurality of axially displaced wet steam inlets each having an inner diameter $D_2$ and disposed below said horizontal axis,
    c. a plurality of dry steam outlets above said horizontal axis,
    d. a plurality of inertial-type moisture separator elements disposed in axially extending banks between said steam inlets and said steam outlets, e. a drain trough below said moisture separator elements for collecting condensate and directing it to a hotwell, f. a plurality of support means axially displaced along the length of said vessel for supporting said drain trough and said moisture separator elements, g. an impingement baffle for each of said wet steam inlets, each impingement baffle disposed between said respective wet steam inlets and said moisture separator elements, and h. each impingement baffle being disposed so that the distance from each end of said impingement baffle to the inner surface of the vessel is S, and S is related to the wet steam inlet inner diameter $D_2$ by the following relationship:

$$S \cong .07 D_2$$

4. The moisture separator recited in claim 3 wherein said drain trough has an arcuate cross-section defined by a radius $R_2$, $R_2$ being related to the inner radius $R_1$ of the vessel and the inner diameter $D_2$ of the wet steam inlet in the following manner:

$$R_1 - R_2 \cong .2 D_2$$

5. The moisture separator recited in claim 4 wherein each of said impingement baffles comprises two relatively straight baffle sections which are attached to said trough over each wet steam inlet, each of said baffle sections roughly comprising a truncated 120° section of a circle defined by a radius $R_3$, $R_3$ being related to the inner diameter $D_2$ of the wet steam inlet by the following relationship:

$$R_3 \cong 1.3 D_2$$

6. The moisture separator recited in claim 5 wherein each of said relatively straight baffle sections is provided with an arcuate portion and a straight portion, a smooth transition being provided from the radius $R_2$ of the curved portion to the straight portion.

7. The moisture separator recited in claim 6 wherein there is a curvature between the wet steam inlet and said vessel, or radius $r$, $r$ being related to the inner diameter $D_2$ of the wet steam inlet in the following manner:

$$r \cong .06 D_2$$

8. The moisture separator recited in claim 7 wherein each of said moisture separator elements has a height H, H being related to the inner diameter $D_2$ of the wet steam inlet in the following manner:

$$H \cong K D_2$$

where $K$ — 1.1 to 1.5

9. The moisture separator recited in claim 8 wherein the distance L between the centers of said steam inlets is related to the inner diameter D of said vessel in the following manner:

$$L \leq 2D$$

10. The moisture separator recited in claim 9 wherein said moisture separating elements have a moisture separator area, $A_{ms}$, said area $A_{ms}$ being a function of total inlet area, $A_2$, and expressed by the following relationship:

$$A_{ms} \cong .1 A_2$$

11. The moisture separator recited in claim 10 wherein the moisture separator banks are disposed in a vee configuration having divergent ends attached to the inner surface of the vessel and convergent ends attached to said support means.

12. The moisture separator recited in claim 11 wherein the support means includes a plurality of inverted vee-shaped elements having divergent ends attached to the inner surface of the vessel and convergent ends attached to said moisture separator elements.

13. The moisture separator of claim 12 wherein said trough is substantially enclosed to provide a sheltered area for the collection of condensate from said moisture separator elements.

* * * * *